United States Patent Office 3,526,576
Patented Sept. 1, 1970

3,526,576
PRODUCTION OF STEROID COMPOUNDS BY MICROBIOLOGICAL CONVERSION
Samuel Cheng Pan, Metuchen, Joan Semar, Somerset, Pacifico Anthony Principe, South River, and Leonard Joseph Lerner, New Brunswick, N.J., assignors to E. R. Squibb & Sons, Inc., New York, N.Y., a corporation of Delaware
No Drawing. Filed May 10, 1968, Ser. No. 728,361
Int. Cl. C07c 167/14
U.S. Cl. 195—51
3 Claims

ABSTRACT OF THE DISCLOSURE

This invention relates to the production of 9α-hydroxyestrone, 9-keto-9,10-seco-estrone and $\Delta^{9(11)}$-estrone by microbiological conversion of 9α-hydroxy-19-norandrostenedione, the latter being derived by microbiological conversion of 19-norandrostenedione. The three products inhibit gonadotropin secretion and are useful in the control of estrus and fertility.

---

This invention relates to the production of 9α-hydroxyestrone, 9-keto-9,10-seco-estrone and $\Delta^{9(11)}$-estrone from 9α - hydroxy - 19 - norandrostenedione (9α-hydroxy-$\Delta^4$-estrene-3,17-dione). By subjecting the 9α-hydroxy-19-norandrostenedione to the action of the enzymes from the cells of a microorganism of the genus Corynebacterium, especially *Corynebacterium simplex*, for about 24 to 36 hours at about 25° C. in a fermentation procedure utilizing conventional sources of assimilable carbohydrate, nitrogenous substances, inorganic salts and growth factors, the three products are obtained. According to the preferred modification acetone dried cells of *C. simplex* are used. Separation and isolation of the compounds may be effected by solvent extraction and chromatographic techniques shown in greater detail in the illustrative examples which follow. 9α-hydroxyestrone is not particularly stable and is best isolated in the form of its 3-ester, e.g., lower fatty acid ester like the acetate.

The 9α-hydroxy-19-norandrostenedione, which is converted to the three products, may be obtained by treating 19-nor-$\Delta^4$-androstene-3,17-dione to the action of the enzymes from the cells of a microorganism of the genus Nocardia, especially *Norcardia restrictus*, or the genus Corynespora, especially *Corynespora melonis*.

The three products derived according to this invention inhibit gonadotropin secretions and are useful as antifertility agents and for the control of estrus in farm animals like cows, sheep or pigs in artificial insemination programs, e.g., by intramuscular injection of about 0.1 to 10 mg./kg. of the substance in a conventional injectible vehicle 2 to 3 times weekly.

The following examples are illustrative of the invention. All temperatures are on the centigrade scale.

EXAMPLE 1

9α-hydroxy-19-nor-$\Delta^4$-androstene-3,17-dione by fermentation with *Corynespora melonis*

(A) Fermentation: Surface growth from each of 4 10 day old agar slant cultures of *Corynespora melonis* [(CBS) Central Bureau voor Schimmel Cultures Baarn, Netherlands] the slant containing as a nutrient medium (A):

| | Grams |
|---|---|
| Oatmeal | 20 |
| Tomato paste, add to 500 ml. boiling tap water | 20 |
| Agar | 15 |
| Tap water, 500 ml. | | is suspended in 5 ml. of a 0.01% sodium lauryl sulfate aqueous solution. One ml. portions of the suspension are used to inoculate twelve 250 conical flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |
| Distilled water to 1 liter. | |

After 72 hours of incubation at 25° C. with continuous rotary agitation (280 cycles/minute; 2 inch stroke) 5% (vol./vol.), transfers are made to 80 250 ml. conical flasks each containing 50 ml. of the following sterilized medium (C):

| | Grams |
|---|---|
| Dextrose | 10 |
| Corn steep liquor | 6 |
| $NH_4H_2PO_4$ | 3 |
| Yeast extract | 2.5 |
| $CaCO_3$ | 2.5 |
| Distilled water to 1 liter. | |

After 24 hours of incubation, using the same conditions as described above, the steroid (500 micrograms/ml.) is added by supplementing each flask with 0.25 ml. of a sterile solution (100 mg./ml.) of 19-nor-$\Delta^4$-androstene-3,17-dione in N,N-dimethylformamide. A total of 2.0 grams is fermented. After 6 hours of further incubation using identical conditions as described above, the fermentation is harvested. The contents of the flasks are pooled to give a total volume of 4500 ml.

(B) Isolation and characterization: The combined fermentation broth is extracted three times with 900 ml. portions of methyl isobutyl ketone (MIBK). The combined MIBK extracts are washed with water, dried over anhydrous sodium sulfate and concentrated to dryness under vacuum leaving about 900 mg. of crude product. This material is chromatographed on 24 16″ x 8″ glass plates coated with a thin layer of Silica Gel GF (Merck), 1 mm. in thickness with a mixture of benzene (3 vol.) and 95% acetone (1 vol.) as the developing solvent. The development of the chromatogram is repeated four times. The UV-absorbing band, moving with 9/10 the mobility of the substrate, i.e. 19-norandrostenedione, is eluted with a 1:1 (by volume) mixture of methanol and chloroform. After evaporating off the solvent, the residue is partitioned between chloroform and a 1:1 (by volume) mixture of water and methanol. The chloroform phase, upon evaporation under vacuum to dryness, yields crystalline 9α-hydroxy-19-nor-$\Delta^4$-androstene-3,17-dione. It is recrystallized from acetone-hexane to yield the pure product, M.P. about 211°;

$\lambda_{max.}^{CHCl_3}$ 3435, 1736, 1645, 1608 cm.$^{-1}$

EXAMPLE 2

9α-hydroxy-19-nor-$\Delta^4$-androstene-3,17-dione by fermentation with *Nocardia restrictus*

Surface growth from a 10-day old agar slant culture of *Nocardia restrictus* (ATCC 14887), the slant containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of a 0.01% sodium lauryl sulfate aqueous solution. One ml. portions of the suspension are used to inoculate four 250 ml. conical flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After 48 hours of incubation at 25° C. with continuous rotary agitation (280 cycles/minute; 2 inch stroke), 5% (vol./vol.) transfers are made to twenty 250 ml. conical flasks each containing 50 ml. of freshly sterilized medium (B).

Steroid (300 micrograms/ml.) is then added by supplementing each flask with 0.25 ml. of a sterile solution (60 mg./ml.) of 19-nor-$\Delta^4$-androstene-3,17-dione in N,N-dimethylformamide. A total of 300 mg. is fermented.

After approximately 10 hours of further incubation, using identical conditions as described above, the fermentation is harvested. The contents of the flasks are pooled, giving a total volume of 1000 ml.

The broth is extracted, chromatographed and the band eluted in exactly the same manner as described in Example 1. 9α-hydroxy-19-nor-$\Delta^4$-androstene-3,17-dione is obtained as a crystalline product M.P. 211°.

EXAMPLE 3

9α-hydroxyestrone and its 3-acetate by growing culture of *Corynebacterium simplex*

(A) Fermentation: Surface growth from each of two 2-week old agar slants of *Corynebacterium simplex* (ATCC 6946), the slants containing as a nutrient medium (A):

| | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.01% aqueous sodium lauryl sulfate solution. One ml. portions of this suspension are used to inoculate two 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After 24 hours of incubation at 25° C. with continuous rotary agitation (280 cycles/minute; 2 inch stroke), 5% (vol./vol.) transfers are made to twenty 250 ml. Erlenmeyer flasks, each containing 50 ml. of freshly sterilized medium B. The steroid (250 micrograms/ml.) is added by supplementing each flask with 0.25 ml. of a sterile solution (50 mg./ml.) of 9α-hydroxy-19-nor-$\Delta^4$-androstene-3,17-dione in N,N-dimethylformamide. A total of 250 mg. is fermented. After 24 hours of incubation, using identical conditions as described above, the contents of the flasks are pooled, and the broth is extracted three times with 200 ml. portions of methyl isobutyl ketone (MIBK). The MIBK extract, after concentration to a small volume under vacuum, is chromatographed on Brinkmann abrasive resistant Silica Gel GF (2 mm. in thickness) precoated plates, a mixture of 20 volumes of chloroform and 1 volume of methanol being employed as the developing solvent. Each plate (8″ x 8″) holds an amount of the extract equivalent to 20 mg. of the substrate used. The weakly UV-absorbing phenolic band moving with a mobility equal to 9/10 of that of the 9α-hydroxy-19-norandrostenedione is eluted with a mixture of equal volumes of chloroform and methanol. On evaporating the eluate to dryness under vacuum, essentially pure 9α-hydroxyestrone is obtained.

The 9α-hydroxyestrone thus obtained is treated with a mixture of one volume of acetic anhydride and three volumes of pyridine. The reagent is used at a rate of 1 ml. per 50 mg. of the original substrate used. After allowing the mixture to stand at room temperature overnight, an equal volume of methanol is added and the mixture is evaporated under vacuum to dryness. The evaporation residue is again chromatographed on the Brinkmann Silica Gel GF precoated plates. A mixture of 10 volumes of benzene and 1 volume of 95% was used as the developing solvent. The weakly UV-absorbing band moving with an $R_f=0.3$ and showing the reaction for a phenolic acetate is eluted with a mixture of equal volumes of methanol and chloroform. The eluate is partitioned between chloroform and a 1:1 mixture of methanol and water. The chloroform phase after being dried over anhydrous sodium sulfate deposits crystalline 9α-hydroxy-estrone-3-acetate upon evaporation to dryness under vacuum. Recrystallization from acetone-n-hexane yields the pure product, M.P. 170°;

$\lambda^{KBr}_{max.}$ 3435, 1778, 1732, 1610, 1583, 1495 cm.$^{-1}$, $\lambda^{CCl_4}_{max.}$ 3620 cm.$^{-1}$; NMR (in $CDCl_3$ witn TMS standard) 2.45τ(C-1 H), 3.05τ(C-2 H), 3.14τ(C-4 H), 7.71τ(C-3 acetate), 9.10τ(C-18 H)

EXAMPLE 4

9-keto-9,10-seco-estrone by growing culture of *Corynebacterium simplex*

Following the procedure of Example 3 to the point where the extract of the fermentation broth is chromatographed on the Silica Gel GF plates, the weakly UV-absorbing phenolic band moving with a mobility equal to 1.5 of that of the substrate is eluted with a 1:1 methanol-chloroform mixture. The eluate is partitioned between chloroform and a 1:1 methanol-water mixture. The chloroform phase after being dried over anhydrous sodium sulfate and evaporated to dryness deposits a crystalline residue of 9-keto-9,10-seco-estrone. Recrystallization from acetone-n-hexane yields the pure compound, M.P. 139°;

$\lambda^{KBr}_{max.}$ 3435, 1740, 1697, 1608, 1600, 1555, 1505 cm.$^{-1}$, NMR (in DMSO with TMS standard) 2.98τ(C-1 H), 3.4τ(C-2 H), 3.4τ(C-4 H), 3.4τ(C-10 H), 8.92τ(C-18 H).

EXAMPLE 5

$\Delta^{9(11)}$-estrone from the growing culture of *Corynebacterium simplex*

Following the same procedure of Example 4, the strongly UV-absorbing phenolic band moving with a mobility equal to twice that of the 9α-hydroxy-19-nor-androstenedione is eluted as described in Example 4. The chloroform phase likewise deposits a crystalline residue of $\Delta^{9(11)}$-estrone on evaporation to dryness. Recrystallization from acetone-n-hexane yields the pure product, M.P. 256° $[\alpha]_D +186°$ (C–1, $CHCl_3$);

$\lambda^{alc.}_{max.}$ 264 mμ (ε 18,000), 299 (ε3110) $\lambda^{KBr}_{max.}$ 3270, 1720, 1617, 1605, 1524, 1500 cm.$^{-1}$; NMR (in DMSO with TMS standard) 2.62τ(C-1 H), 3.47τ(C-2 H), 3.56τ(C-4 H), 4.01τ(C-11 H), 9.18τ(C-18 H).

The $\Delta^{9(11)}$-estrone thus obtained is identical with the $\Delta^{9(11)}$-estrone obtained from 11β-hydroxyestrone by the following procedure.

11β-hydroxyestrone (600 mg.) is dissolved in glacial acetic acid (60 ml.) containing 0.3 ml. of conc. sulfuric acid. The solution is heated in a boiling water bath for 30 minutes. Tests on thin layer chromatogram show that 11β-hydroxyestrone has virtually all been converted to $\Delta^{9(11)}$-estrone by this treatment.

The solution is diluted with 250 ml. of water and the steroid is extracted into chloroform by shaking three times with 50 ml. portions of chloroform. The chloroform extract is decolorized by heating with 0.5 g. of Nuchar at 50° for 30 minutes. After filtering off the charcoal, the chloroform solution is concentrated down to a small volume and chromatographed on three 16″ x 8″ glass plates coated with Silica Gel GF (Merck), 1 mm. in thickness, with chloroform containing 2% methanol as the developing solvent. The main heavy UV-absorbing band of $R_f=0.5$ is eluted with a 1:1 mixture of chloroform and methanol. After evaporating off the solvent, the residue is partitioned between equal volumes of chloroform and a 1:1 mixture of methanol and water. The chloroform phase, upon evaporation under vacuum to dryness yields crystalline $\Delta^{9(11)}$-estrone. It is recrystallized from acetone-n-hexane to yield about 200 mg. of pure $\Delta^{9(11)}$-estrone, M.P. about 255°; $[\alpha]_D+186°$ (C–1, CHCl$_3$);

$\lambda_{max.}^{ETOH}$ 264 m$\mu$ ($\epsilon$ 18,000); 299 m$\mu$ ($\epsilon$ 3110)

EXAMPLE 6

9α-hydroxyestrone and its 3-acetate by acetone-dried cells of *Corynebacterium simplex*

Following the procedure of Example 3 with the exception that testosterone (as inducer) is used in place of 9α-hydroxy-19-norandrostenedione, the cells of the culture of *Corynebacterium simplex* are harvested at the end of 72 hours by centrifugation. The packed cells are washed three times with a phosphate buffer containing 0.005 mole each of KH$_2$PO$_4$ and Na$_2$H$_2$P$_2$O$_7$ per liter and adjusted to pH 7.0. The washed cells are diluted with an equal volume of phosphate buffer of pH 7.0. This cell suspension is added dropwise, with constant stirring, into 10 times its volume of acetone which is chilled at a temperature not above 5° C. The deposit on the bottom is immediately filtered on a Buchner funnel with suction, washed with a small volume of acetone and then air dried. A suspension of 50 mg. of the acetone-dried cells per ml. of the pH 7.0 buffer is prepared by blending the cells with the buffer in a Waring Blendor. The substance, 9α-hydroxy-19-norandrostenedione, and 2-methyl-naphthoquinone are added as their solutions in ethanol to give final concentrations of 500 μg./ml. and 0.4 mM. respectively, the quantity of ethanol introduced being held within 5% of the total. The reaction mixture is allowed to stand at 30° for 30 minutes, after which it is extracted twice with ¼ of its volume of methyl isobutyl ketone. The methyl isobutyl ketone extract is processed in exactly the same manner as described in Example 3 to yield essentially pure 9α-hydroxyestrone and also pure 9α-hydroxyestrone-3-acetate of M.P. 170°.

EXAMPLE 7

9-keto-9,10-seco-estrone by acetone-dried *Corynebacterium simplex* cells

Following the procedure of Example 6, to the point where the concentrated MIBK extract is chromatographed on the silica gel plate as in Example 3, the weakly UV-absorbing phenolic band, which moves with a mobility equal to 1.5 of that of 9α-hydroxy-19-norandrostenedione, is eluted and further treated as described in Example 4 to obtain 9-keto-9,10-seco-estrone of M.P. 139°.

EXAMPLE 8

$\Delta^{9(11)}$-estrone by acetone dried *Corynebacterium simplex* cells

Following the procedure of Example 7, the strongly UV-absorbing phenolic band, which moves with a mobility equal to twice that of 9α-hydroxy-19-norandrostenedione, is eluted and processed as described in Example 5 to obtain $\Delta^{9(11)}$-estrone of M.P. 256°.

What is claimed is:
1. A process which comprises subjecting 9α-hydroxy-19-norandrostenedione to the enzymes of a microorganism of the genus *Corynebacterium* in a fermentation medium containing an assimilable source of carbohydrate, nitrogenous substances, inorganic salts and growth factors, and recovering 9α-hydroxyestrone, 9-keto-9,10-seco-estrone and $\Delta^{9(11)}$-estrone therefrom.

2. A process according to claim 1 wherein the microorganism is *Corynebacterium simplex*.

3. A process for the production of $\Delta^{9(11)}$-estrone which comprises subjecting 9α-hydroxy-19-norandrostenedione to the enzymes of *Corynebacterium simplex* in a fermentation medium containing an assimilable source of carbohydrate, nitrogenous substances, inorganic salts and growth factors until a substantial amount of $\Delta^{9(11)}$-estrone is present in said fermentation medium.

References Cited

UNITED STATES PATENTS 3,023,229   2/1962   Muir et al.
3,243,355   3/1966   Holmlund et al.

ALVIN E. TANENHOLTZ, Primary Examiner

U.S. Cl. X.R.

260—590, 397.45